Patented Dec. 10, 1935

2,023,982

UNITED STATES PATENT OFFICE 2,023,982

PROCESS FOR BREAKING PETROLEUM EMULSIONS

Charles N. Stehr, Alhambra, Calif., assignor to Tretolite Company, Webster Groves, Mo., a corporation of Missouri No Drawing. Application November 12, 1934, Serial No. 752,717

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or subjected to an equivalent separatory procedure.

The treating agent or demulsifying agent contemplated for use in my process consists of a mixture composed of blown castor oil, or similar reactive fatty bodies, mixed with the composite dehydration products of ricinoleic acid, of the kind characterized by:

(a) A normal iodine number;
(b) An acid number approximating ⅔ or less of that of ricinoleic acid;
(c) An acetyl number approximating ⅔ or less of ricinoleic acid;
(d) Substantial absence of ether type anhydrides; and
(e) The property of regenerating ricinoleic acid by saponification and acidification.

Instead of employing conventionally blown castor oils as one component of the mixture employed as a reagent in my process, I may employ a blown oil obtained by the conventional oxidation of a mixture of castor oil and a semi-drying oil, as described in my co-pending application for patent Serial No. 752,715, filed November 12, 1934, or I may employ a blown oil obtained by conventional oxidation of a mixture of castor oil and sardine oil, of the kind described for use as a reagent in breaking oil field emulsions in my co-pending application for patent Serial No. 752,716, filed November 12, 1934.

In the case of all these blown oils, either derived from castor oil alone or a mixture of castor oil and rapeseed oil, for example, one may employ not only the naturally-occurring glyceride itself, but one may employ the fatty acid, if desired. I will use the expression "blown reactive oil" to mean blown oils of the kind heretofore described, without limitation as to whether they be derived from a naturally-occurring glyceride or fatty acid, or a mixture of the same, or derived from several different oils, instead of a single oil, such as castor oil. The expression "conventionally blown reactive fatty bodies", as herein used, is intended to include such materials as castor oil, rape seed oil, etc. which are commonly oxidized to produce blown oils. Such materials, prior to conventional oxidation, are liquids at ordinary temperature, and their reactivity to oxidation by air is due to the unsaturated state, as indicated by an iodine number of 85 or higher. Such reactive materials susceptible to oxidation by conventional methods, obviously exclude butter, lard, etc.

Blown oils, derived from castor oil by conventional oxidation processes, have been employed for breaking crude oil emulsions. They may be employed in the manner described in U. S. Patent No. 1,929,399, dated October 3, 1933, to Fuchs. Conventionally blown castor oil, or other similar oils may be used in specific mixtures of the kinds described in application for patent of De Groote and Wirtel, Serial No. 715,773, filed March 15, 1934. Conventionally blown castor oil or similar materials may be employed in peculiar mixtures of the kind described in my co-pending application for patent Serial No. 752,713, filed November 12, 1934.

I have found that, when certain dehydration products of ricinoleic acid of a kind to be subsequently described are mixed with conventionally blown oils of the kind previously described, within the ratio range of 1 to 5 and 5 to 1, one obtains a valuable demulsifying agent which is much more effective for breaking crude oil emulsions than either of the components constituting the mixture when used alone. The dehydrated ricinoleic acid body constituting one member of the mixture which is employed as a demulsifying agent in my process, is produced by heating or dehydrating ricinoleic acid. The material thus obtained is employed to furnish one constituent of the mixture comprising the demulsifying agent used in my process, as such, or after subsequent esterification, with an added alcohol, or after neutralization (not saponification) with a base such as caustic soda, strong ammonia, caustic potash, etc. and most satisfactorily of all, with triethanolamine.

The word "saponification" is used in the chemistry of fats to indicate the conversion of fats, that is, esters, into fatty acids or their salts. The conversion of a fat into the sodium salt, that is, soap-making, is frequently referred to as "saponification." Likewise, the neutralization of a fatty acid is referred to as "saponification." The saponification number is an analytical index, which indicates the amount of caustic potash required to replace the glycerol ester or acidic hydrogen, or the like, in a suit of fatty material.

When fats are saponified so as to yield the corresponding fatty acids, the process is sometimes referred to as acid saponification, because the reaction is commonly carried out in the presence of an acid, such as sulfuric acid, and also in the presence of a catalyst, such as a Twitchell reagent or a Petroff reagent. Often it is conducted at an elevated temperature above the boiling point of water, and sometimes under pressure. Processes intended to produce similar results may depend upon hydrolysis with steam in presence of small amounts of alkalies, or on reaction with water in the presence of enzymes. Naturally, a fat might be saponified with alkali so as to produce the sodium salt and this salt might be dissolved in water and the fatty acid liberated by means of a dilute mineral acid, such as hydrochloric acid.

Having obtained ricinoleic acid by any one of such processes, I proceed to dehydrate the ricinoleic acid in order to obtain one member of the mixture employed as a demulsifying agent in my present process. The easiest method is to heat the ricinoleic acid at slightly above 100° C., or thereabouts, until the acid value has dropped to approximately two thirds or less of the acid value of ricinoleic acid (188), and the acetyl value has dropped in similar proportion. The acetyl value of ricinoleic acid is 164. Under these conditions, the iodine number remains substantially normal, as indicated by value of 80 to 85. A lower temperature can be employed in presence of a non-sulfonating dehydrating agent, such as anhydrous sodium sulfate. Any equivalent method of dehydration may be employed.

The fatty material, thus obtained, is differentiated from ricinoleic acid by virtue of a decreased saponification value and decreased acetyl value. This product is obtained by dehydration, that is, principally by removal of water of esterification, and perhaps to a minor degree by removal of water formed by combination of two carboxyl radicals, that is, the formation of an anhydride. Such a product cannot be obtained by decomposition of the kind wherein castor oil is distilled until a loss of weight is incurred, such as 10% or more. When such last named products are saponified and acidified, ricinoleic acid is not regenerated, because pyrolytic decomposition has previously taken place. If the product contemplated for use in the present process for treating cut oil is saponified and acidified, then ricinoleic acid is regenerated.

It is also true that material somewhat similar at first casual examination to the material employed as one component of the mixture used as a demulsifying agent in my present process, but in reality different in composition, may be obtained by the sulfation of castor oil. For example, in the manufacture of Turkey red oil from castor oil, if sulfation is followed by an effective hydrolytic washing process, so as to decompose the fatty acid sulfates, there results somewhat similar materials. This is not customary in the manufacture of Turkey red oil, because one is interested in conserving the fatty acid sulfate content, and not in destroying it. However, in the sulfation of castor oil or ricinoleic acid, at least partial saturation of the ethylene linkages takes place by the formation of an addition product. Subsequently, when the hydrolytic washing process takes place, the sulfuric addition product is decomposed and the ethylene linkage is then saturated by means of an added hydrogen atom and an added hydroxyl radical. Thus, the somewhat similar products obtained by sulfation and effective hydrolytic washing are differentiated from ordinary Turkey red oil manufacture, are characterized by products having a reduced or lower iodine number, that is, iodine number which is sub-normal compared with the normal iodine number of castor oil or ricinoleic acid which happens to be approximately 80 to 88. Therefore, in order to differentiate the product employed as one member of the mixture, constituting the reagent of the present process from the products obtained by sulfation of castor oil, followed by effective hydrolytic process, I will indicate that the products employed to furnish one ingredient of the mixture employed in the present process must have a normal iodine value. Furthermore, sulfation of castor oil may result, after effective hydrolytic washing, in products having some ether type bodies present. Ether type bodies are derivatives of ricinoleic acid or the like, in which two alcoholiform hydroxyls combine with the loss of a molecule of water. When such products are saponified and esterified, the acetyl value does not go back to normal, because the ether type bodies do not regenerate hydroxyl groups by saponification and acidification. This is analogous to the fact that ordinarily ethyl ether plus alkali does not readily produce ethyl alcohol. Therefore, the products employed as one member of the mixture, constituting the reagent in the present process are further characterized and differentiated from other somewhat similar products by being free from ether type bodies.

I prefer to prepare my reagent or demulsifying agent in the following manner:

Approximately 1,000 lbs. of castor oil is subjected to an acid saponification process in the presence of a small amount of dilute sulphuric acid and in the presence of a Petroff reagent, so as to produce a product, which, in acid value and in acetyl value approximates ricinoleic acid. The 900 lbs. of product so obtained, or ricinoleic acid obtained from any other suitable source, is then heated at or slightly above the boiling point of water for approximately thirty hours until both the acetyl value and the acid value have dropped to about two-thirds of the normal values of ricinoleic acid. The product is then analyzed to determine the percentage of carboxylic hydrogen. The product consists essentially of ricinoleic acid, various polyricinoleic acids, and probably very small amounts of ricinoleic acid anhydride. An equivalent amount of triethanolamine, usually about 100 lbs., is then added so as to produce a water-soluble product which is just barely alkaline to phenolphthalein indicator. An equal weight, about 1000 lbs., of a conventionally oxidized, kerosene-soluble castor oil is added, with subsequent stirring, with the further addition of approximately 500 lbs. kerosene. The resultant reagent is then ready for use in practising the present process.

If desired, neutralization of the dehydrated ricinoleic acid by means of triethanolamine may be omitted. The addition of kerosene may also be omitted, but it is desirable, because otherwise the demulsifying agent is almost too viscous to be handled by means of chemical proportional pumps. Instead of employing kerosene as a diluent, one may employ any of the solvents conventionally employed for diluting or thinning demulsifying agents of the kind employed in breaking oil field emulsions. Such diluents include petroleum distillates such as gasoline, kerosene, etc., coal tar distillates such as benzol, xylene, solvent naphtha, etc., methyl alcohol, denatured alcohol, etc. The selection of the solvent depends largely on the nature of the added blown oil.

Conventionally oxidized blown oils generally exhibit an acid number, and I have found it desirable at times to neutralize this free acidic hydrogen with triethanolamine, or a similar base, which will neutralize the acidic hydrogen without saponifying or decomposing any esters or ester-like bodies which may be present. I do not find it desirable to saponify or treat the blown oils with caustic soda or caustic potash, or with a similar base. If desired, in the preparation of the preferred reagent previously noted, I may subsequently add triethanolamine after the addition of the blown oil, so as to neutralize the acidic hydrogen of the blown oil.

My mixture may be employed for dehydration, provided that it is made from the two members within the ratio of 1 to 5 and 5 to 1. I have found a mixture of substantially equal weight of the two members to be most desirable.

The superiority of the reagent or demulsifying agent contemplated by my process is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve said oil field emulsions in a certain number of cases which can not be treated as easily and at so low a cost with the demulsifying agents heretofore available.

In practising my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° C., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500 above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid, so as to yield fatty materials, said product being characterized by (a) A normal iodine number;

(b) Acid number approximating ⅔ or less of that of ricinoleic acid;

(c) An acetyl number approximating ⅔ or less of ricinoleic acid;

(d) Substantial absence of ether type anhydrides;

(e) The property of regenerating ricinoleic acid by saponification and acidification, said mixture being further characterized by the fact that (A) and (B) are within the ratio range of 1 to 5 and 5 to 1.

2. A process for breaking petroleum emulsions of the water-in-oil type, which consists in subjecting the emulsion to the action of a demulsifying agent, comprising a mixture composed of:

(A) Conventionally blown reactive castor oil; and (B) Dehydrated ricinoleic acid bodies, derived by the dehydration of ricinoleic acid, so as to yield fatty materials, said product being characterized by (a) A normal iodine number;

(b) Acid number approximating ⅔ or less of that of ricinoleic acid;

(c) An acetyl number approximating ⅔ or less of ricinoleic acid;

(d) Substantial absence of ether type anhydrides;

(e) The property of regenerating ricinoleic acid by saponification and acidification, said mixture being further characterized by the fact that (A) and (B) are within the ratio range of 1 to 5 and 5 to 1.

3. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture being further characterized by the fact that (A) and (B) are within the ratio range of 1 to 5 and 5 to 1.

4. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture being diluted with a solvent and being further characterized by the fact that the proportions of (A) and (B) are within the ratio range of 1 to 5 and 5 to 1.

5. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture being diluted with petroleum distillate solvent and being further characterized by the fact that the proportions of (A) and (B) are within the ratio range of 1 to 5 and 5 to 1.

6. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture being diluted with kerosene and being further characterized by the fact that (A) and (B) are within the ratio range of 1 to 5 and 5 to 1.

7. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture being diluted with kerosene and being further characterized by the fact that the proportions of (A) and (B) are substantially equal.

8. A process for breaking petroleum emulsions of the water-in-oil type, which consists in subjecting the emulsion to the action of a demulsifying agent, comprising a mixture composed of:

(A) Conventionally blown reactive fatty bodies; and (B) Dehydrated ricinoleic acid bodies, derived by the dehydration of ricinoleic acid neutralized with triethanolamine, so as to yield fatty materials, said product being characterized by (a) A normal iodine number;
(b) Acid number approximating ⅔ or less of that of ricinoleic acid;
(c) An acetyl number approximating ⅔ or less of ricinoleic acid;
(d) Substantial absence of ether type anhydrides;
(e) The property of regenerating ricinoleic acid by saponification and acidification, said mixture containing approximately 25%, by volume, of kerosene and being further characterized by the fact that the proportions of (A) and (B) are substantially equal.

CHARLES N. STEHR.